United States Patent
Ma et al.

(10) Patent No.: US 7,818,166 B2
(45) Date of Patent: Oct. 19, 2010

(54) METHOD AND APPARATUS FOR INTENTION BASED COMMUNICATIONS FOR MOBILE COMMUNICATION DEVICES

(75) Inventors: Changxue C Ma, Barrington, IL (US); Michael E. Groble, Lake Zurich, IL (US); James R. Talley, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 847 days.

(21) Appl. No.: 11/669,865

(22) Filed: Jan. 31, 2007

(65) Prior Publication Data

US 2008/0183462 A1 Jul. 31, 2008

(51) Int. Cl.
*G06F 17/27* (2006.01)
(52) U.S. Cl. .......................... 704/9; 704/254
(58) Field of Classification Search ............ 455/76, 455/569.1; 704/9, 222, 235, 220, 251, 254, 704/249, 257
See application file for complete search history.

(56) References Cited

U.S. PATENT DOCUMENTS

| 6,526,382 | B1 | 2/2003 | Yuschik |
| 6,668,256 | B1 | 12/2003 | Lynch |
| 2001/0041978 | A1 | 11/2001 | Crespo et al. |
| 2003/0078777 | A1 | 4/2003 | Shiau |
| 2004/0093200 | A1 | 5/2004 | Scott |
| 2005/0004799 | A1* | 1/2005 | Lyudovyk ................... 704/254 |
| 2006/0161431 | A1 | 7/2006 | Bushey et al. |
| 2006/0195321 | A1 | 8/2006 | Deligne et al. |

OTHER PUBLICATIONS

International Search Report mailed Apr. 23, 2008.

* cited by examiner

*Primary Examiner*—Sam Bhattacharya

(57) ABSTRACT

A method and apparatus for intention based communications in a mobile communication device is disclosed. The method may include receiving an input from a user of the mobile communication device, converting speech portions in the user's input into linguistic representations, generating a phoneme lattice based on the linguistic representations, scoring stored intention n-grams against the generated phoneme lattice, scoring intentions from the intention n grams, determining the highest scoring intention, determining whether the highest scoring intention is above a predetermined threshold, wherein if the highest scoring intention is above the predetermined threshold, executing the determined intention.

20 Claims, 3 Drawing Sheets

METHOD AND APPARATUS FOR INTENTION BASED COMMUNICATIONS FOR MOBILE COMMUNICATION DEVICES

BACKGROUND OF THE INVENTION

1. Field of the Invention

The invention relates to mobile communication devices, and in particular, to intention based communications for mobile communication devices.

2. Introduction

Mobile communication devices such as cellular telephones have been becoming increasingly pervasive in our daily life. Significant progress has been made in providing a voice dialogue system for the mobile devices in an attempt to make them easier to use. To achieve this goal, the instruction or dialogue must be made easy to learn, easy to remember, and easy to retrieve.

To enable a user's voice to control a mobile communication device, conventional practice is to establish communication parameters between user and the cell phone. User has to know in advance the commands the cell phone can understand in terms of the dialogue system.

In addition, users desire the ability to send a short message to another user. However, this is a very difficult problem because that dictation process would consume a large amount of processing resources and out-of-vocabulary words cannot be handled. In this manner, it would be preferable to use a language model in the dictation mode, but to train such a language model is challenge, where data is scarce and dynamical.

On an object-oriented level of abstraction, interaction between objects can be seen as a form of communication. The goal of this communication is to change the state of two objects after messaging. The ways of sending messages are overloaded functions or methods. That means the above mentioned communications can be realized by transferring meanings or intentions rather than passing through exact words.

However, to implement a voice dialogue system on the mobile communication devices, we have to overcome the challenge of limited CPU power and memory resources. The trade off is often achieved by restricting the recognition grammars so that users have to follow a limited set of prescribed commands. Otherwise, the system cannot work. On the other hand, a voice dialogue system implemented on the server side can have more flexibility to allow a user to choose words.

SUMMARY OF THE INVENTION

A method and apparatus for intention based communications in a mobile communication device is disclosed. The method may include receiving an input from a user of the mobile communication device, converting speech portions in the user's input into linguistic representations, generating a phoneme lattice based on the linguistic representations, scoring stored intention n-grams against the generated phoneme lattice, scoring intentions from the intention n-grams, determining the highest scoring intention, determining whether the highest scoring intention is above a predetermined threshold, wherein if the highest scoring intention is above the predetermined threshold, executing the determined intention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

In conventional voice dialogue systems on mobile communication devices with limited CPU and memory resources, the voice recognition grammars are very restricted. The users generally have to follow exactly the system's prescribed commands and sentences. Therefore, the users are required to remember the prescribed sentences and say them exactly to permit the system to satisfy their intention. As a result, the user may grow frustrated if he or she cannot remember the exact system sentence or is not allowed to say the proper words of his or her usual vocabulary or language.

This invention concerns allowing a mobile communication device user more freedom to choose words to communicate with the device to accomplish an intended task. The critical information may be specified by the attributes recognized in the user's input and may be further disambiguated by dialog or a refined information extraction process.

Figure 1:
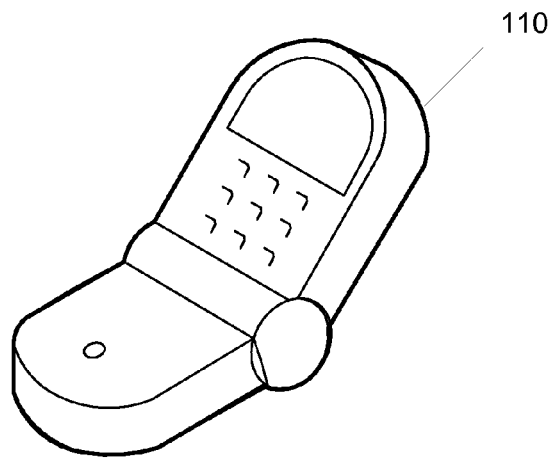
FIG. 1 illustrates an exemplary diagram of a mobile communication device in accordance with a possible embodiment of the invention.
Figure 2:
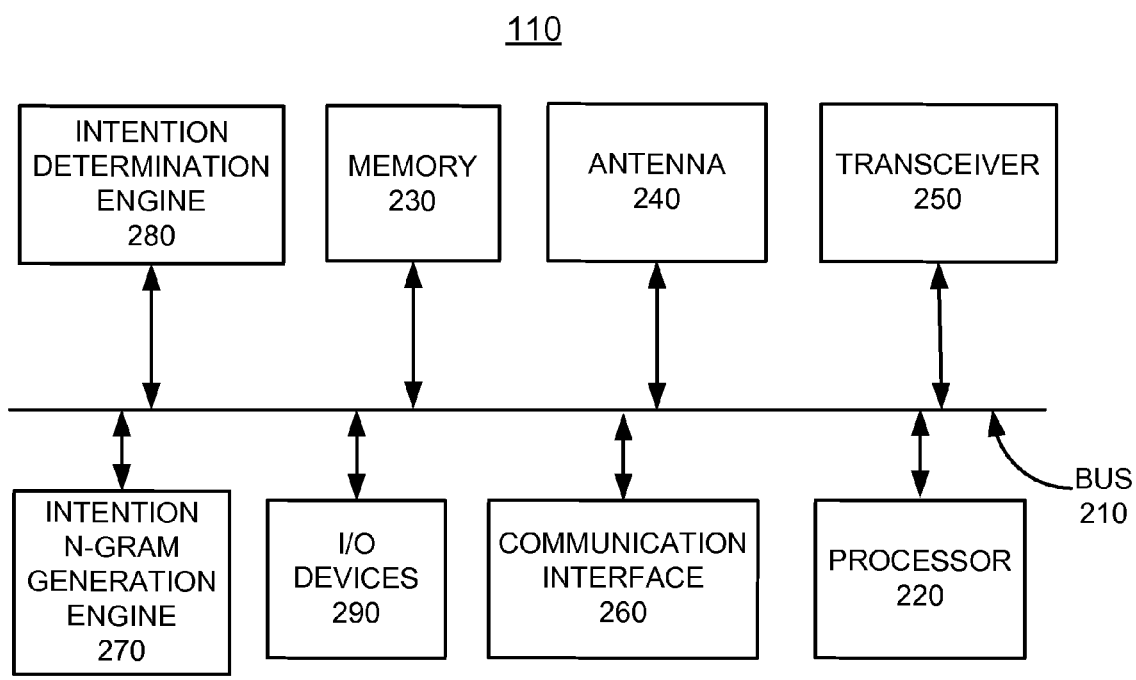
FIG. 2 illustrates a block diagram of an exemplary mobile communication device in accordance with a possible embodiment of the invention.

FIG. 1 illustrates an exemplary diagram of a mobile communication device 110 in accordance with a possible embodiment of the invention. While FIG. 1 shows the mobile communication device 110 as a wireless telephone, the mobile communication device 110 may represent any mobile or portable communication device, including a mobile telephone, cellular telephone, a wireless radio, a portable computer, a laptop, an MP3 player, satellite radio, satellite television, etc FIG. 2 illustrates a block diagram of an exemplary mobile communication device 110 having an intention determination engine 280 in accordance with a possible embodiment of the invention. The exemplary mobile communication device 110 may include a bus 210, a processor 220, a memory 230, an antenna 240, a transceiver 250, a communication interface 260, an intention n-gram generation engine 270, an intention determination engine 280, and input/output (I/O) devices 290. Bus 210 may permit communication among the components of the mobile communication device 110.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Transceiver 250 may include one or more transmitters and receivers. The transceiver 250 may include sufficient functionality to interface with any network or communication station and may be defined by hardware or software in any manner known to one of skill in the art. The processor 220 is cooperatively operable with the transceiver 250 to support operations within the communications network.

Input/output devices (I/O devices) 290 may include one or more conventional input mechanisms that permit a user to input information to the mobile communication device 110, such as a microphone, touchpad, keypad, keyboard, mouse, pen, stylus, voice recognition device, buttons, etc. Output devices may include one or more conventional mechanisms that outputs information to the user, including a display, printer, one or more speakers, a storage medium, such as a memory, magnetic or optical disk, and disk drive, etc., and/or interfaces for the above.

Communication interface 260 may include any mechanism that facilitates communication via the communications network. For example, communication interface 260 may include a modem. Alternatively, communication interface 260 may include other mechanisms for assisting the transceiver 250 in communicating with other devices and/or systems via wireless connections.

The functions of the intention n-gram generation engine 270 and the intention determination engine 280 will be discussed below in relation to FIG. 3 and FIG. 4 in greater detail, respectively.

The mobile communication device 110 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 260.

The mobile communication device 110 illustrated in FIGS. 1-2 and the related discussion are intended to provide a brief, general description of a suitable communication and processing environment in which the invention may be implemented. Although not required, the invention will be described, at least in part, in the general context of computer-executable instructions, such as program modules, being executed by the mobile communication device 110, such as a communications server, or general purpose computer. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including cellular devices, mobile communication devices, personal computers, handheld devices, multi-processor systems, microprocessor-based or programmable consumer electronics, and the like.

Figure 3:
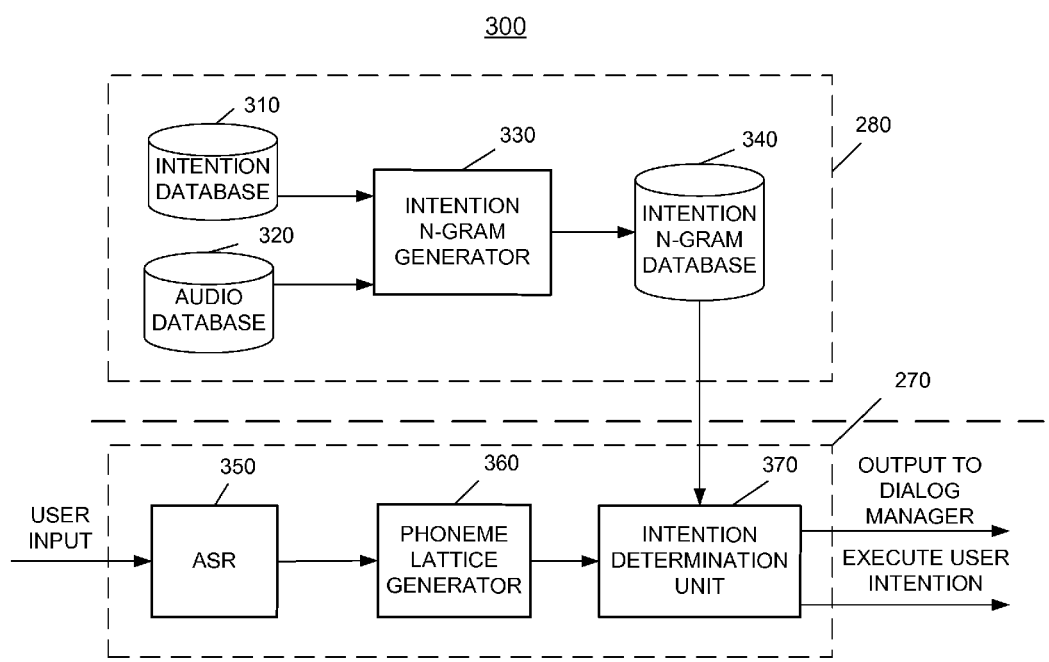
FIG. 3 illustrates an exemplary block diagram of the intention determination engine and intention n-gram generation engine in accordance with a possible embodiment of the invention.

FIG. 3 illustrates an exemplary block diagram of intention n-gram generation and determination system 300 having an intention n-gram generation engine 270 and intention determination engine 280 in accordance with a possible embodiment of the invention. The intention n-gram generation engine 270 may include intention database 310, audio database 320, intention n-gram generator 330, intention n-gram database 340.

Intention database 310 may include a collection of plurality of functions, features, commands, file names, contacts, addresses, etc. which a user may desire to implement or access. For example, intentions may include call, send, dial, view, etc. Audio database 320 may include a collection of a plurality of audio recordings of various ways to express a plurality of functions, features, commands, file names, contacts, addresses, etc. that the user may desire to implement or access. For example, the audio may include "call Megan," "e-mail Matthew," "I want to call my Dad," etc.

The intention n-gram generator 330 extracts n-grams from the audio sentences we have collected in the audio database 320. The n-grams include the variations of the intentions from the intention database 320. The n-grams may be bigrams, trigrams, four-grams, and five-grams, or any number of grams, for example. Each n-gram is associated with a probability. For example:

N-grams: (call Megan, 0.3); (dial Megan, 0.2); (talk to Megan, 0.2); (chat with Megan 0.1); {names}
Attributes: which phone; {place}
Output: calling {name}

The generated n-grams may be used for voice activated communication purposes and allows the user to say anything covered by this intention so that he or she does not have to remember exactly what commands, words, etc. to say. The attributes are for task completion purposes. The necessary attributes may be extracted from the utterance or through the use of further dialog to complete the process. Outputs from the dialog manager may also be used for feedback to the user.

The generated intention n-grams may be stored in an intention n-gram database 340 for use by the intention determination engine 280. The intention determination engine 280 may include automatic speech recognizer (ASR) 350, phoneme lattice generator 360, and intention determination unit 370. For illustrative purposes, the intention determination engine 280 and its corresponding process will be described below in relation to the block diagrams shown in FIGS. 1-3.

Figure 4:
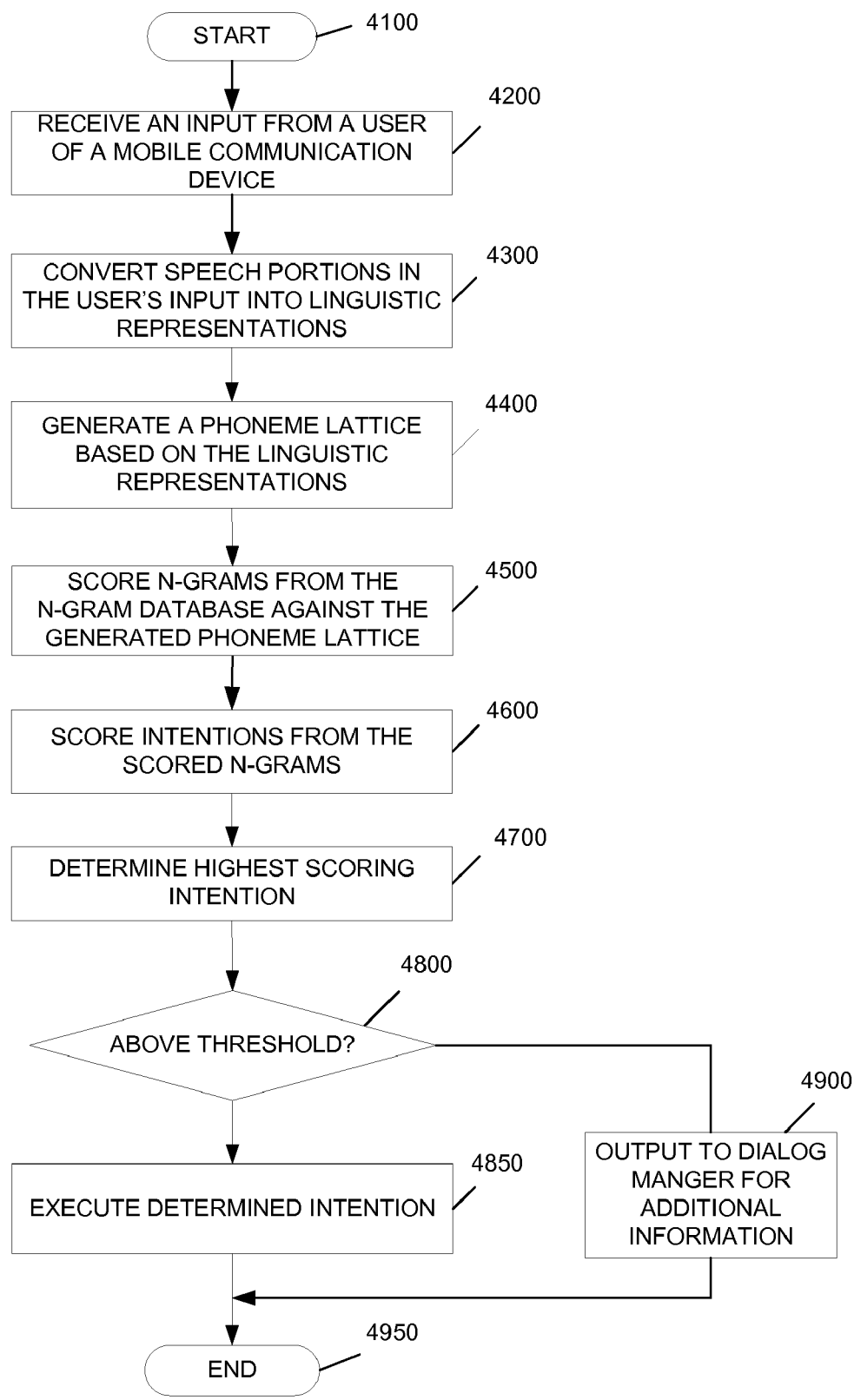
FIG. 4 is an exemplary flowchart illustrating one possible intention determination process in accordance with one possible embodiment of the invention.

FIG. 4 is an exemplary flowchart illustrating some of the basic steps associated with an intention determination process in accordance with a possible embodiment of the invention. The process begins at step 4100 and continues to step 4200 where the ASR 350 receives input from a user of a mobile communication device 110. At step 4300, the ASR 350 converts speech portions in the user's input into linguistic representations, such as phonemes, syllables, morphemes, words, phones, articulatory distinctive features, or acoustic distinctive features.

The recognition results from ASR 350 may be in the form of universal linguistic representations which cover the languages that the user of the mobile communication device chooses. For examples, a Chinese user may choose Chinese and English as the languages for the communication devices. An American user may choose English and Spanish as the languages used for the devices. In any event, the user may choose at least one language to use. The universal linguistic representations may include phonemes, syllables, morphemes, words, phones, articulatory distinctive features, or acoustic distinctive features of at least one language.

At step 4400, the phoneme lattice generator 360 may derive or generate a lattice from the linguistic representations. A lattice, which may be a phoneme lattice for example, may be made up of a series of connected nodes and edges. Each edge may represent a phoneme with a score, for example, the log of the probability of the hypothesis. The nodes on the two ends of each edge denote the start time and end time of the phoneme. Multiple edges (hypothesis) may occur between two nodes and the most probable path from the start to the end is called "the best path".

For an ideal system, the best-path will match exactly the words or phoneme string that the user utters every sentence. However, although the best path does not match the user's speech, the alternative paths in the lattice may match. If no matched paths are found, fragments, such as words, phones or phonemes, of the paths may be found. Therefore, the lattice serves the role of a document containing many repetitions of individual tokens, such as phonemes.

To match the phoneme lattice, the n-gram word transcriptions are provided by the dictionary where phoneme string is given for each word. The frequency counts of all the tokens based on their occurrences and acoustic scores on the lattice are computed. From the frequency counts of the tokens, a statistical model is built to provide the probability of a given tokens within the context of previous tokens or following tokens, such as token $x_1[p(x_1|L)]$ and token $x_m$ given previous token $x_{m-1}[p(x_M|x_{M-1}, L)]$.

From the individual token probability, the probability of a given string of tokens, such as phoneme strings from the n-gram words can be computed. Given a phoneme lattice L determined from a user utterance, the probabilistic estimate of a phoneme string of length M $p(x_1 x_2 \ldots x_M|L)$ associated with an N-gram for a particular utterance for which a lattice L has been generated as:

$p(x_1 x_2 \ldots x_M|L) = p(x_1|L)p(x_2|x_1, L) \ldots p(x_M|x_{M-1}, L)$, where $p(x_1 x_2 \ldots x_M|L)$ is the estimated probability that the N-gram having the phoneme string $x_1 x_2 \ldots x_M$ occurred in the utterance from which lattice L was generated. The probability of occurrence, or probabilistic estimate of the phoneme string $p(x_1 x_2 \ldots x_M|L)$ associated with an N-gram for a particular utterance for which a lattice L has been generated can be determined more generally as $p(x_1 x_2 \ldots x_M|L) = p(x_1|L) p(x_2|x_1, L)p(x_3|x_2, x_1, L) \ldots p(x_M|x_{M-1}, \ldots x_{M+1-N}, L)$, where $p(x_1 x_2 \ldots x_M|L)$ is the estimated probability that the N-gram having the phoneme string $x_1 x_2 \ldots x_M$ occurred in the utterance from which lattice L was generated; The probability may then be normalized by the number of tokens in the string and conditioned by its priori probability. A high normalized probability may result in a good match between the given string and the lattice.

At step 4500, the intention determination unit 370 scores n-grams from the intention n-gram database 340 against the generated phoneme lattice from the phoneme lattice generator 360. At step 4600 the intention determination unit 370 scores intentions from the scored n-grams.

At step 4700, the intention determination unit 370 determines the highest scoring intention. At step 4800, the intention determination unit 370 determines whether the highest scoring intention is above a predetermined threshold. If the intention determination unit 370 determines that the highest scoring intention is above a predetermined threshold, then at step 4850, the intention determination unit 370 executes the determined intention. The process then goes to step 4950 and ends.

If at step 4800 the intention determination unit 370 determines that the highest scoring intention is not above the predetermined threshold, then at step 4900, the intention determination unit 370 outputs information concerning the interaction, such as the recognition results, attributes, etc., to a dialog manager in order to retrieve additional information to process the user's intention. The process then goes to step 4950 and ends.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the intention determination engine in FIGS. 2 and 3 each processing the content in various possible ways. It does not necessarily need to be one system used by all end users. Accordingly, the appended claims and their legal equivalents should only define the invention, rather than any specific examples given.

We claim:

1. A method for intention-based communications in a mobile communication device, the method comprising:
   receiving an input from a user of the mobile communication device;

converting speech portions in the user's input into linguistic representations;
generating a phoneme lattice based on the linguistic representations;
scoring stored intention n-grams against the generated phoneme lattice;
scoring intentions from the intention-n grams;
determining the highest scoring intention; and
determining whether the highest scoring intention is above a predetermined threshold, wherein if the highest scoring intention is above the predetermined threshold, then executing the determined intention.

2. The method of claim 1 wherein if the highest scoring intention is not above the predetermined threshold, then outputting information concerning the user's input to a dialog manager.

3. The method of claim 2 further comprising:
receiving feedback from a dialog manager concerning the user's intentions.

4. The method of claim 1 further comprising:
generating the intention n-grams from at least one of: stored intention attributes, sentences, and speech; and
storing the generated intention n-grams in an intention n-gram database.

5. The method of claim 1 wherein the intention n-grams are at least one of: bigrams, trigrams, four-grams, and five-grams and include attributes used to determine the user's intentions.

6. The method of claim 1 wherein the linguistic representations are at least one of: words, morphemes, syllables, phones, phonemes, articulatory distinctive features, and acoustic distinctive features of at least one language.

7. The method of claim 1 wherein the mobile communication device is one of: a wireless telephone, a mobile telephone, a cellular telephone, a wireless radio, a portable computer, a laptop, an MP3 player, a satellite radio, and a satellite television.

8. An apparatus for intention-based communications in a mobile communication device, the apparatus comprising:
an automatic speech recognizer that receives an input from a user of the mobile communication device and converts speech portions in the user's input into linguistic representations;
a phoneme lattice generator that generates a phoneme lattice based on the linguistic representations; and
an intention determination unit that scores stored intention n-grams against the generated phoneme lattice, scores intentions from the intention n-grams, determines the highest scoring intention, and determines whether the highest scoring intention is above a predetermined threshold, wherein if the highest scoring intention is above the predetermined threshold, then the intention determination unit executes the determined intention.

9. The apparatus of claim 8 wherein if the intention determination unit determines that the highest scoring intention is not above the predetermined threshold, then the intention determination unit outputs information concerning the user's input to a dialog manager.

10. The apparatus of claim 9 wherein the intention determination unit receives feedback from a dialog manager concerning the user's intentions.

11. The apparatus of claim 8 further comprising:
an intention n-gram database; and
an intention n-gram generator that generates the intention n-grams from stored intention attributes and stored audio and stores the generated intention n-grams in the intention n-gram database.

12. The apparatus of claim 8 wherein the intention n-grams are at least one of: bigrams, trigrams, four-grams, and five-grams and include attributes used by the intention determination unit to determine the user's intentions.

13. The apparatus of claim 8 wherein the linguistic representations are at least one of: words, morphemes, syllables, phones, phonemes, articulatory distinctive features, and acoustic distinctive features of at least one language.

14. The apparatus of claim 8 wherein the mobile communication device is one of: a wireless telephone, a mobile telephone, a cellular telephone, a wireless radio, a portable computer, a laptop, an MP3 player, a satellite radio, and a satellite television.

15. A mobile communication device comprising:
an intention n-gram database that stores intention n-grams generated from stored intention attributes and stored audio; and
an intention determination engine that receives an input from a user of the mobile communication device and converts speech portions in the user's input into linguistic representations, generates a phoneme lattice based on the linguistic representations, scores stored intention n-grams against the generated phoneme lattice, scores intentions from the intention n grams, determines the highest scoring intention, and determines whether the highest scoring intention is above a predetermined threshold, wherein if the highest scoring intention is above the predetermined threshold, then the intention determination engine executes the determined intention.

16. The mobile communication device of claim 15 wherein if the intention determination engine determines that the highest scoring intention is not above the predetermined threshold, then the intention determination engine outputs information concerning the user's input to a dialog manager.

17. The mobile communication device of claim 16 wherein the intention determination engine receives feedback from a dialog manager concerning the user's intentions.

18. The mobile communication device of claim 15 wherein the intention n-grams are at least one of: bigrams, trigrams, four-grams, and five-grams and include attributes used by the intention determination engine to determine the user's intentions.

19. The mobile communication device of claim 15 wherein the linguistic representations are at least one of: words, morphemes, syllables, phones, phonemes, articulatory distinctive features, and acoustic distinctive features of at least one language.

20. The mobile communication device of claim 15 wherein the mobile communication device is one of: a wireless telephone, a mobile telephone, a cellular telephone, a wireless radio, a portable computer, a laptop, an MP3 player, a satellite radio, and a satellite television.

* * * * *